(12) United States Patent
Dahlstedt

(10) Patent No.: US 7,194,494 B1
(45) Date of Patent: Mar. 20, 2007

(54) METHOD FOR GARBAGE COLLECTION OF UNUSED METHODS

(75) Inventor: Joakim Dahlstedt, Stockholm (SE)

(73) Assignee: Bea Systems, Inc., San Jose, CA (US)

( * ) Notice: Subject to any disclaimer, the term of this patent is extended or adjusted under 35 U.S.C. 154(b) by 78 days.

(21) Appl. No.: 10/111,566

(22) PCT Filed: Oct. 27, 2000

(86) PCT No.: PCT/SE00/02096

§ 371 (c)(1),
(2), (4) Date: Oct. 31, 2002

(87) PCT Pub. No.: WO01/31455

PCT Pub. Date: May 3, 2001

(30) Foreign Application Priority Data

Oct. 28, 1999 (SE) .................................... 9903890

(51) Int. Cl.
*G06F 12/12* (2006.01)
(52) U.S. Cl. ...................................... 707/206
(58) Field of Classification Search .................. 707/2, 707/5, 6, 206; 717/154; 711/132; 718/100
See application file for complete search history.

(56) References Cited

U.S. PATENT DOCUMENTS

| | | | | |
|---|---|---|---|---|
| 5,088,036 A | | 2/1992 | Ellis et al. .................. 707/206 |
| 5,355,483 A | * | 10/1994 | Serlet .......................... 711/154 |
| 5,652,883 A | * | 7/1997 | Adcock ....................... 707/206 |
| 5,915,255 A | | 6/1999 | Schwartz et al. ........... 707/206 |
| 6,041,179 A | * | 3/2000 | Bacon et al. ................ 717/116 |
| 6,463,581 B1 | * | 10/2002 | Bacon et al. ................ 717/154 |
| 6,654,951 B1 | * | 11/2003 | Bacon et al. ................ 717/154 |

FOREIGN PATENT DOCUMENTS

WO    WO99/32978    7/1999

OTHER PUBLICATIONS

Pascal Fradet, Collecting More Garbage, 1994, ACM, pp. 1-10.*
Amitabh Srivastava, Unreachable Procedures in Object-Oriented Programming, 1992, ACM, pp. 1-10.*

* cited by examiner

*Primary Examiner*—Paul Rodriguez
*Assistant Examiner*—Luke Osborne
(74) *Attorney, Agent, or Firm*—Fliesler Meyer LLP

(57) ABSTRACT

A method for improving the effectiveness of a data processing application when using a virtual machine, wherein the program includes a large number of methods, i.e. program sections, that are stored in the memory of the computer used, and wherein the program uses a garbage collecting procedure. The invention is characterized by analysing in a first step all so called thread stacks with respect to the procedures required thereby; causing each of said requisite methods to be regenerated in a second step, wherein occurring references to a method prior to the regeneration are replaced with references to regenerated methods; and by erasing all non-regenerated methods in a third step and placing corresponding memory space at the disposal of the program.

14 Claims, 1 Drawing Sheet

```
foo()
{
    x;            4711: x
    bar();        4712: call 4720
    y;            4713: y
} apa()
{
                  4714: .
                  4715: .
                  4716: .
                  4717: .
                  4718: .
}                 4719: .

bar()
{
    .
}                 4720: .
```

```
foo_ny()
{
    x;            4900: x
    bar();        4901: call 4903
    y;            4902: y
} bar()
{
                  4903: .
}
```

METHOD FOR GARBAGE COLLECTION OF UNUSED METHODS

BACKGROUND OF THE INVENTION

The present invention relates to a method of improving the effectiveness of a data processing application.

More specifically, the invention is concerned with increasing the data processing rate in virtual machines, and then particularly with respect to the JAVA program language.

The invention is not restricted to JAVA, but can be applied with many program languages, although the invention is described below primarily with reference to JAVA.

The method is intended for use with adaptive optimisation of a program. In adaptive optimisation, the program is restructured and different parts of the program are optimised as the program is run. The general problem of increasing data processing capacity resides in the rapid creation of new memory sites, since the longer the program is run, the more memory space is required.

JAVA and other dynamic program language include an automatic memory management. This means that the programmer need not keep an account of those parts of the memory that are used. The virtual machine carries out a so-called garbage collection from time to time, meaning, in principle, that the virtual machine scans the entire memory and finds which objects have been stored in the memory and which the program can no longer address. These parts of the memory are returned for later use.

JAVA also includes methods for so called thread management methods. Thus, JAVA incorporates a system for supporting or simulating the simultaneous processing of two or more programs. The thread management can be divided into two parts. One part concerns the manner in which different threads are structured in a controlled manner. Another part is concerned with which threads shall be run and which threads shall be passive and wait to be run.

In order to further increase effectiveness and place occupied memory space at the disposal of the program, it is not sufficient to solely optimise the memory with respect to the objects.

The present invention solves this problem.

SUMMARY OF THE INVENTION

The present invention thus relates to a method of improving the effectiveness of a data processing application when using a virtual machine, where the program includes many application methods, i.e. program sections, that are stored in the memory of the computer used, and where garbage collecting is used by said program, wherein the inventive method is characterised by a first step in which all so-called thread stacks are analysed with respect to application methods required thereby; a second step in which each of the application methods required is caused to be regenerated where occurrent references to an application method are replaced with reference to regenerated application methods prior to the regeneration of an application method; and by a third step in which all non-regenerated application methods are erased, wherein the corresponding memory space is placed at the disposal of said program.

BRIEF DESCRIPTION OF THE DRAWINGS

The present invention will now be described in more detail partly with reference to an exemplifying embodiment of the invention shown on to the accompanying drawing, in which.

DETAILED DESCRIPTION OF THE INVENTION

Figures 1, 2, 3:
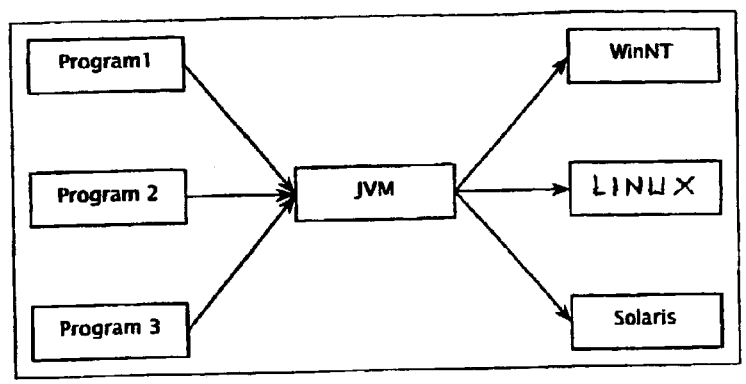
FIG. 1 is a block diagram.
FIG. 2 illustrates old application methods.
FIG. 3 illustrates application methods regenerated in accordance with the invention.

FIG. 1 shows that a JAVA virtual machine, JVM, can be used to run different data programs 1,2,3, regardless of whether the operative system is WinNT, LINUX, Solaris or some other system. As mentioned above, although JAVA is a very popular program language, the present invention is not restricted to this language but can be applied to all object-orientated and platform-independent corresponding program languages.

The present invention thus relates to a method of improving the effectiveness of a data processing application when using a virtual machine, wherein the program includes a large number of application methods, i.e. program sections, that are stored in the memory of the computer used, and wherein a garbage collecting process is used by the program.

It is previously known to garbage collect objects and therewith erase objects that are no longer in current use thereby placing corresponding memory capacity at disposal.

In large systems, many application methods, i.e. program sections, are used one or a few times, or application methods are applied for a short period of time and then left unused.

In the case of JAVA and corresponding programs, new application methods are loaded and old application methods left unused.

Furthermore, adaptive optimisation results in the optimisation and re-optimisation of application methods placed in the memory, where old application methods are left unused.

When optimising lock mechanism selection and garbage collection selection, it is necessary to replace all used application methods that use old mechanisms with new mechanisms.

According to the invention, all so called thread stacks are analysed with respect to the application methods required, in a first step of the inventive method. In a second step, each of the application methods required is regenerated, where occurrent references to a application method are replaced with references to regenerated application methods prior to said regeneration. In a third step, all non-regenerated application methods are erased and the corresponding memory space placed at the disposal of the program.

This procedure does not only clean-out unused application methods, but also results in a reorganisation between those application methods that have been regenerated, so as to direct references of the application methods immediately to a regenerated application method instead of proceeding via an old application method that is no longer used.

This is illustrated in FIGS. 2 and 3, of which FIG. 2 illustrates old application methods and FIG. 3 illustrates used regenerated application methods. Three application methods foo, apa and bar are shown in FIG. 2. Foo starts on the memory address 4711. Apa starts on the address 4714 and bar starts on the address 4720.

Analysts of the thread stacks shows that only the application methods foo and bar are used, and consequently foo and bar have not been referenced to the application method apa The application method foo and bar are regenerated to those application methods illustrated in FIG. 3. In this case, the application methods foo and bar are recreated precisely, although with the difference that the application methods obtain new addresses and that then the foo reference to bar points to the new bar address 4903.

All old application methods, i.e. the methods in FIG. 2, are erased and the memory spaces previously occupied by these application methods are vacated for further use.

When garbage collection of objects takes place, running of the program normally stops while garbage collection takes place. Running of the program is restarted subsequent to the garbage collection and to the erasure of objects that are not in use.

Such a method can be used when applying the present invention.

However, it is very much preferred to use the following method instead.

When practicing the inventive method, one thread is stopped at a time whilst the program is running, wherewith application methods used for a stopped thread are transferred to a list and the thread then restarted. The application methods in the list are then regenerated and stored. All threads are later caused to be stopped at the same time, subsequent to having treated all threads in this way, namely so that all used application methods relating to the threads concerned have been regenerated. All application methods that have not been regenerated are erased and all threads are restarted with the regenerated application methods.

This method obviates the need to stop running the program, since the regeneration takes place intermittently.

As before mentioned, lock mechanisms are used in JAVA and corresponding languages. Different lock mechanisms can be selected. The important thing is to select the lock mechanism that is the most effective in preventing more than one thread having access to a given object at the same time as another thread.

A synchronisation problem exists when several threads desire access to one and the same object or source. In order to solve this problem in JAVA, each thread endeavours to reach the source look. The source look mechanism can be used in various ways. The effectiveness of different lock mechanisms will depend on how threads endeavour to obtain access to synchronised sources.

According to a preferred embodiment, when locking mechanisms are used the most effective locking mechanisms are identified in a step prior to said first step, and the methods that use a thus identified locking mechanism are regenerated.

With respect to garbage collecting algorithms, these also need to be selected. Many object orientated languages use garbage collection. This means that the programmer need not instruct the system explicitly that a certain object is no longer required. The system is responsible for this detection, and reclaims the part of the memory occupied by the object. A number of different algorithms have been proposed for effective implementation of this detection and reclaim. It has been found that different algorithms are best for different applications. The choice of the best garbage collecting algorithm for the program application being run is highly significant in achieving maximum execution rate in respect of the program concerned.

According to another preferred embodiment of the invention, when different garbage collecting algorithms are used the allocation and length of life of the various objects are determined in a step prior to said first method step, whereafter the most effective garbage collecting algorithm is caused to be identified and the application methods constituting the requisite garbage collecting algorithms are regenerated and remaining garbage collecting algorithms then erased.

Application of the preferred embodiments provides a highly effective method for optimising codes, threads and memory management, where a generic feature resides in the identification and regeneration of application methods so as to not load the system with unused application methods.

The invention claimed is:

1. A process for optimizing the distribution of application methods within the memory space of a computer system or virtual machine, wherein the application methods are part of an application program and wherein the computer system or virtual machine includes a plurality of threads, comprising the steps of:
   analyzing thread stacks to determine a selection of application methods by stopping each thread one at a time,
      determining a selection of application methods currently required by the stopped thread, and
      restarting the stopped thread;
   creating regenerated application methods by
      copying the selection of application methods to new memory addresses,
      determining if any of the application methods reference any of the selection of application methods, and
      replacing each reference by an application method to one of the selection of application methods, with a corresponding reference to the new memory address of the one of the selection of application methods; and
   erasing all non-regenerated application methods and releasing the memory space occupied by those non-regenerated application methods, for subsequent use by the application program.

2. The process of claim 1 for optimizing the distribution of application methods within the memory space of a computer system or virtual machine, wherein said step of analyzing includes for each of a selection or all of the threads transferring application methods used for the stopped thread to a regenerate list, and, wherein said step of creating regenerated application methods includes a step of
   regenerating the application methods in said regenerate list; and,
   wherein said step of erasing includes the substeps of
      stopping all threads simultaneously,
      erasing all application methods that have not been regenerated, and,
      restarting those threads with the regenerated application methods.

3. The process of claim 1 for optimizing the distribution of application methods within the memory space of a computer system or virtual machine, including, when locking mechanisms are used, the steps of:
   identifying a locking mechanism that prevents more than one thread having access to a given object at the same time as another thread; and,
   regenerating those application methods that use the identified locking mechanism.

4. The process of claim 2 for optimizing the distribution of application methods within the memory space of a computer system or virtual machine, including, when locking mechanisms are used, the steps of:
- identifying a locking mechanism that prevents more than one thread having access to a given object at the same time as another thread; and,
- regenerating those application methods that use the identified locking mechanism.

5. The process of claim 1 for optimizing the distribution of application methods within the memory space of a computer system or virtual machine, including, when different garbage collecting algorithms are used, the steps of:
- determining the allocation and lifetime of the objects in use;
- selecting one of a plurality of garbage collecting algorithms;
- regenerating the application methods that use the selected garbage collecting algorithm; and,
- erasing the remaining garbage collecting algorithms.

6. The process of claim 2 for optimizing the distribution of application methods within the memory space of a computer system or virtual machine, including, when different garbage collecting algorithms are used, the steps of:
- determining the allocation and lifetime of the objects in use;
- selecting one of a plurality of garbage collecting algorithms;
- regenerating the application methods that use the selected garbage collecting algorithm; and,
- erasing the remaining garbage collecting algorithms.

7. The process of claim 3 for optimizing the distribution of application methods within the memory space of a computer system or virtual machine, including, when different garbage collecting algorithms are used, the steps of:
- determining the allocation and lifetime of the objects in use;
- selecting one of a plurality of garbage collecting algorithms;
- regenerating the application methods that use the selected garbage collecting algorithm; and,
- erasing the remaining garbage collecting algorithms.

8. The process of claim 4 for optimizing the distribution of application methods within the memory space of a computer system or virtual machine, including, when different garbage collecting algorithms are used, the steps of:
- determining the allocation and lifetime of the objects in use;
- selecting one of a plurality of garbage collecting algorithms;
- regenerating the application methods that use the selected garbage collecting algorithm; and,
- erasing the remaining garbage collecting algorithms.

9. A method for use with a computer for improving the effectiveness of a data processing application or program using a virtual machine or runtime environment, wherein the data processing application or program uses a plurality of application methods that are stored in the memory of the computer, and wherein the method uses a garbage collecting procedure, comprising the steps of:
- analyzing all threads stacks with respect to the application methods required thereby;
- causing each of said requisite application methods to be regenerated, wherein occurring references to a application method prior to regenerations are replaced with references to regenerated application methods;
- erasing all non-regenerated application methods and releasing the corresponding memory space;
- causing one thread at a time to be stopped;
- transferring application methods used for a stopped thread to a list;
- restarting the stopped thread;
- regenerating and storing the application methods in said list;
- causing all threads to be stopped simultaneously subsequent to having treated all threads in said fashion; and,
- erasing all application methods that have not been regenerated, and restarting all threads with the regenerated application methods.

10. The method according to claim 9, including, when different garbage collecting algorithms are used, the steps of:
- determining the allocation and length of life of the various objects;
- selecting one of a plurality of garbage collecting algorithms;
- regenerating the application methods that use the selected garbage collecting algorithm; and,
- erasing the remaining garbage collecting algorithms.

11. A system for improving the effectiveness of a data processing application or program using a virtual machine or runtime environment, wherein the data processing application or program uses a plurality of application methods that are stored in the memory of the computer, comprising:
- a processor; and,
- processor-readable instructions which when executed cause the processor to perform the steps of
  - analyzing all thread stacks with respect to the application methods required thereby;
  - causing each of said requisite application methods to be regenerated, wherein occurring references to a application method prior to regeneration are replaced with references to regenerated application methods;
- erasing all non-regenerated application methods and releasing the corresponding memory space;
- wherein the processor-readable instructions further include instructions which when executed cause the processor to perform the steps of
  - causing one thread at a time to be stopped;
  - transferring application methods used for a stopped thread to a list;
  - restarting the stopped thread;
  - regenerating and storing the application methods in said list;
  - causing all threads to be stopped simultaneously subsequent to having treated all threads in said fashion; and,
  - erasing all application methods that have not been regenerated, and restarting all threads with the regenerated application methods.

12. The system according to claim 11, wherein when locking mechanisms are used, the processor-readable instructions further include instructions which when executed cause the processor to perform the steps of
- identifying a locking mechanism that prevents more than one thread having access to a given object at the same time as another thread; and,
- regenerating those application methods that use a thus identified locking mechanism.

13. The system according to claim 11, wherein the processor-readable instructions further include instructions which when executed cause the processor to perform the steps of
    determining the allocation and length of life of the various objects;
    selecting one of a plurality of garbage collecting algorithms;
    regenerating the application methods that use the selected garbage collecting algorithm; and,
    erasing the remaining garbage collecting algorithms.

14. The system according to claim 12, wherein the processor-readable instructions further include instructions which when executed cause the processor to perform the steps of
    determining the allocation and length of life of the various objects;
    selecting one of a plurality of garbage collecting algorithms;
    regenerating the application methods that use the selected garbage collecting algorithm; and,
    erasing the remaining garbage collecting algorithms.

* * * * *

UNITED STATES PATENT AND TRADEMARK OFFICE
CERTIFICATE OF CORRECTION

PATENT NO. : 7,194,494 B1
APPLICATION NO. : 10/111566
DATED : March 20, 2007
INVENTOR(S) : Joakim Dahlstedt It is certified that error appears in the above-identified patent and that said Letters Patent is hereby corrected as shown below:

Col. 3, line 1, delete "Analysts" and insert therefor --Analysis--.

Col. 3, line 46, first occurrence, delete "look" and insert therefor --lock--.

Col. 3, line 46, second occurrence, delete "look" and insert therefor --lock--.

Signed and Sealed this

Twenty-third Day of October, 2007

JON W. DUDAS
*Director of the United States Patent and Trademark Office*